Sept. 15, 1942.　　　　S. C. GREENLEAF　　　　2,295,783
RIVET GAUGE
Filed Sept. 8, 1941
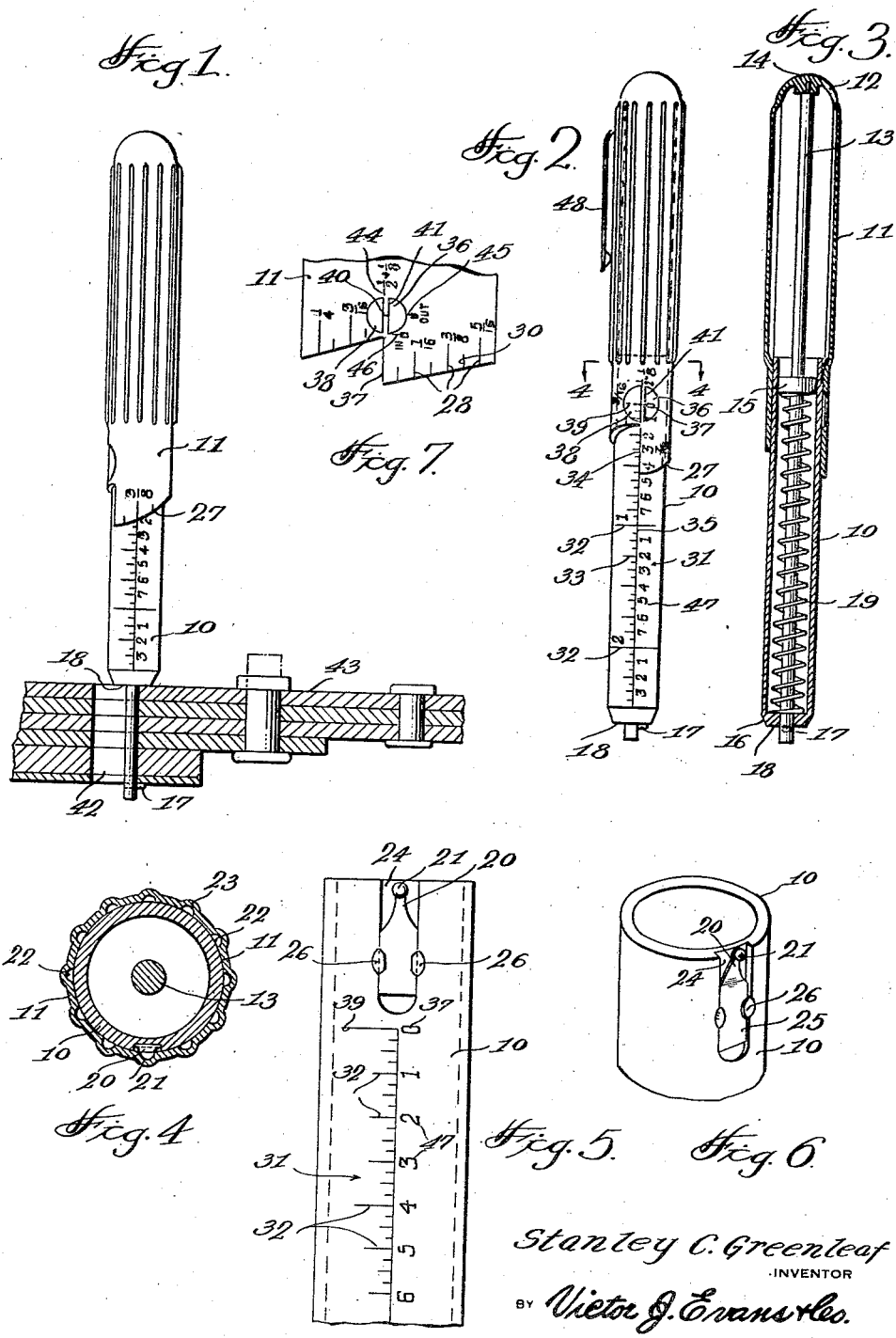
Stanley C. Greenleaf
INVENTOR
BY Victor J. Evans & Co.
ATTORNEYS Patented Sept. 15, 1942

2,295,783

UNITED STATES PATENT OFFICE 2,295,783

RIVET GAUGE

Stanley C. Greenleaf, San Diego, Calif.

Application September 8, 1941, Serial No. 410,068

8 Claims. (Cl. 33—143)

My invention relates to the selection of rivets with respect to correct lengths for holes of predetermined and variable diameters, and has among its objects and advantages the provision of an improved rivet gauge.

Figure 1 is an elevational view of the rivet gauge illustrating the manner in which it is applied to a piece of work for determining correct rivet length for a bore of given diameter;

Figure 2 is a view illustrating the rivet gauge apart from the work and as it may be carried on the person;

Figure 3 is a longitudinal sectional view of the gauge;

Figure 4 is an enlarged sectional view taken along the line 4—4 of Figure 2;

Figure 5 is an enlarged view of a portion of one part of the gauge illustrating a portion of the rivet length scale;

Figure 6 is a perspective view of a portion of the part illustrated in Figure 5; and Figure 7 is a fragmentary view of another part of the gauge illustrating the rivet diameter scale which operates in conjunction with the scale of Figure 5 for indicating the correct rivet lengths based on the respective diameters thereof.

In the embodiment selected to illustrate the invention, I make use of a first tube 10 slidable in a second tube or grip 11. To the closed end 12 of the tube 11 is secured a rod 13, as by the riveted connection 14. A disk 15 is secured to the rod 13 intermediate its ends, with the disk slidably fitted inside the tube 10.

The outer end of the tube 10 is provided with a wall 16 bored for slidably receiving the rod 13, the latter being provided with a work-engaging pin 17 which normally engages the work-engaging face 18 of the wall 16. Such engagement is yieldingly maintained by reason of a compression spring 19 having one end abutting the wall 16 and its other end engaging the disk 15. Thus the spring 19 normally maintains the tubes 10 and 11 in the positions of Figures 2 and 3, and the pin 17 restrains the tube 10 from further outward movement with respect to the tube 11.

While the two tubes 10 and 11 are arranged for relative axial movement, the two tubes are also arranged for relative rotary motion in predetermined steps or degrees. To the inner end of the tube 10 is secured a resilient finger 20 having a small head 21 arranged to selectively enter grooves 22 in the tube 11 fashioned by reason of ribs 23 struck therefrom. There are twelve grooves 22, which grooves are positionally related to the rivet diameter scale on the tube 11. Because of the resilient nature of the finger 20, the tube 11 may easily be rotated relatively to the tube 10, but location of the head 21 in one of the grooves 22 restrains the two tubes from accidental relative rotation.

In Figure 6, the outer face of the tube 10 is provided with a longitudinal groove 24 in which the plate 25 of the finger 20 is positioned and made secure by peening the tube, as at 26. The depth of the groove 24 is slightly greater than the thickness of the plate 25 so as to eliminate any obstructing formations with respect to the tube 11.

The inner end of the tube 11 is provided with a spirally fashioned edge 27, this helix having a three-eighth inch pitch. The outer face of the tube 11 adjacent the edge 27 is provided with twelve division lines 28 marked in fractional inches, as at 29, to represent common rivet diameters. The spaces between the conventional rivet diameter lines 28 may be subdivided, as at 30.

On the outer face of the tube 10 is provided a scale 31 for determining the lengths of rivets having diameters selected from the scale on the tube 11. The scale 31 has an overall length of two and one-half inches. The inch lines are indicated at 32 and the scale is also provided with fractional inch lines 33 of one-eighth inch values. Additional division lines may be provided, as illustrated in Figures 1, 2 and 5.

In the normal position of the tube, as in Figure 2, the straight edge 34 on the tube 11 may be brought into registration with the index line 35 running through the scale 31 longitudinally of the tube 10. In this position, the window 36 in the tube 11 exposes the zero 37 of the scale 31, and the window 38 exposes the zero line 39. A line 30 is provided on the rib 41 separating the two windows 36 and 38, which line is then in registration with the zero line 39.

In operation, the rod 13 may be projected from the tube 10 by pressing the tube 11 downwardly on the tube 10. The rod 13 is then inserted in the bore 42 for positioning the pin 17 underneath the work 43. The tension of the spring 19 will bring the face 18 into further engagement with the opposite face of the work 43. The tube 11 is then rotated on the tube 10 to bring the division line 28 corresponding to the predetermined rivet diameter into registration with the line 35. At this time the rivet length is determined by noting the intersecting position of the edge 27 with respect to the scale 31.

Figure 1 illustrates the tube 11 positioned with its three-eighth-inch line 28 in registration with the line 35, at which time the edge 27 indicates a rivet length of one and one-fourth inch, this being the required length of the rivet for a three-eighth-inch bore in work of the thickness illustrated. This reading gives the grip length plus the amount necessary to form a regulation size flat head rivet. The grooves 22 are so spaced and selectively coact with the finger 21 as to yieldingly latch the tubes 10 and 11 in the respective relative positions of the tube corresponding to the twelve rivet diameters indicated by the divisional lines 28. The one-eighth and one-half inch division line of the rivet diameter scale is indicated at 44, see Figure 7, and aligns with the edge 27. The spring 19 permits the operator to insert the rivet gauge into the hole and take a reading with one hand.

The rivet gauge may be used as a simple caliper by positioning the tube 11 in accordance with Figure 2. Under such conditions, the reading is taken in connection with the line 45 adjacent the window 36 and labeled "Out," designating outside measurement. The rivet gauge may be employed as a depth gauge, as the pin 17 is positioned exactly one-eighth inch from the end of the rod 13, at which time the reading is taken from the line 46 labeled "In." The window 38 exposes the division lines of the scale 31, while the window 36 exposes the numerals 47 of the scale.

A pencil clip 48 is connected with the tube 11, with the rivet gauge so proportioned that the tool may be carried in the pocket.

Without further elaboration, the foregoing will so fully illustrate my invention, that others may, by applying current knowledge, readily adapt the same for use under various conditions of service.

I claim:

1. A rivet gauge for determining the length of rivets for holes of predetermined diameters comprising a work-engaging member provided with a rivet length scale having an index means, a companion work-engaging means having an element for projection through the hole in the work being measured and slidably and rotatably connected with said member, said work-engaging means being provided with a rivet diameter scale traversing said rivet length scale and adjustable relatively thereto through rotation of said work-engaging means relatively to said member, and a reading locator on said work-engaging means traversing said rivet length scale for indicating the rivet length for a hole of given diameter when said diameter scale is adjusted to a position for registering that diameter on the scale with said index means.

2. The invention described in claim 1 wherein said reading locator comprises an edge of helical formation formed on said work-engaging means.

3. The invention described in claim 1 wherein said companion work-engaging means comprises in part a tube slidably and rotatably embracing said work-engaging member, with said reading locator comprising a spirally contoured end of the tube.

4. The invention described in claim 1 wherein said work-engaging member and said work-engaging means are each of tubular formation, with the tube of the work-engaging means embracing the tube of the work-engaging member, said element comprising a rod located inside both tubes and secured to the tube of the work-engaging means and projecting beyond one end thereof, a projection on the rod exteriorly of said work-engaging member, and a spring acting on said rod and said work-engaging member for yieldingly holding said projection in engagement with said work-engaging member.

5. The invention described in claim 1 wherein the said rivet diameter scale includes divisions, and wherein yielding latch means are provided for yieldingly restraining relative rotary movement of the member with respect to said work-engaging means in positions corresponding to said divisions.

6. A rivet gauge for determining the respective lengths of rivets for holes of predetermined diameters comprising a work-engaging tube provided with a rivet length scale extending longitudinally thereof and having an index line, a companion tube slidably and rotatably embracing said work-engaging tube and having a helically contoured end rotatably traversing said rivet length scale, a rod attached to one end of said companion tube and extending through the work-engaging tube to a position exteriorly thereof, a work-engaging pin secured to said rod exteriorly of the work-engaging tube, a spring acting on said rod and said work-engaging tube for normally holding said pin in engagement with one end of the work-engaging tube, said helically contoured edge comprising a reading locator for indicating the rivet length for a hole of given diameter when said diameter scale is adjusted to a position for registering that diameter on the scale with said index line, said companion tube having an edge arranged for registration with said index line through rotation of the companion tube on the work-engaging tube, said rivet length scale including divisions and numerical indicia associated with said divisions, and said companion tube being provided with windows respectively exposing said divisions and said numerical indicia when said edge is in registration with said index line.

7. The invention described in claim 1 wherein said rivet diameter scale includes divisions, said work-engaging means comprising a tube rotatably and slidably embracing said work-engaging member, said tube being fashioned with grooves extending longitudinally thereof, and resilient means selectively receivable in said grooves for yieldingly latching the tube to the work-engaging member in positions corresponding to said divisions.

8. The invention described in claim 1 wherein said work-engaging means comprises a tube slidably and rotatably embracing said work-engaging member, a shaft fixed to said work-engaging means and having a work-engaging pin located exteriorly of said work-engaging member, said rivet length scale including divisions and numerical indicia associated with said divisions, and said tube being provided with windows respectively exposing said divisions and said numerical indicia when said tube is moved longitudinally on said work-engaging member, with said windows provided with indicators coacting with said rivet length scale to indicate the respective distances from the end of said shaft and said pin and the work-engaging member.

STANLEY C. GREENLEAF.